(12) United States Patent
Van Vliet et al.

(10) Patent No.: US 7,078,002 B2
(45) Date of Patent: *Jul. 18, 2006

(54) MIXING DEVICE COMPRISING A SWIRL CHAMBER FOR MIXING LIQUID

(75) Inventors: Willem Van Vliet, The Hague (NL); Arie Pieter Den Hartog, deceased, late of Leidschendam (NL); by Maria Den Hartog-Snoeij, legal representative, Leidschendam (NL)

(73) Assignee: Shell Oil Company, Houston, TX (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/433,995

(22) PCT Filed: Dec. 11, 2001

(86) PCT No.: PCT/EP01/14736

§ 371 (c)(1),
(2), (4) Date: Jun. 10, 2003

(87) PCT Pub. No.: WO02/48286

PCT Pub. Date: Jun. 20, 2002

(65) Prior Publication Data

US 2004/0037759 A1    Feb. 26, 2004

(30) Foreign Application Priority Data

Dec. 11, 2000  (EP) ................... 00311008

(51) Int. Cl.
*B01J 8/02*  (2006.01)
*B01J 8/04*  (2006.01)
*C10G 49/00*  (2006.01)

(52) U.S. Cl. .............. 422/195; 422/194; 422/224; 366/341

(58) Field of Classification Search ........... 422/194, 422/195, 224; 366/341
See application file for complete search history.

(56) References Cited

U.S. PATENT DOCUMENTS

| 3,353,924 | A | | 11/1967 | Riopelle | |
| 3,787,189 | A | * | 1/1974 | Muffat et al. | 422/310 |
| 3,855,068 | A | | 12/1974 | Lieberman | |
| 4,669,890 | A | * | 6/1987 | Peyrot | 366/341 |
| 4,836,989 | A | * | 6/1989 | Aly et al. | 422/195 |
| 5,403,560 | A | * | 4/1995 | Deshpande et al. | 422/190 |
| 5,426,719 | A | * | 6/1995 | Franks et al. | 704/228 |

(Continued)

FOREIGN PATENT DOCUMENTS

EP        0 427 733        5/1991

(Continued)

*Primary Examiner*—N. Bhat
(74) *Attorney, Agent, or Firm*—Charles W. Stewart

(57) ABSTRACT

The invention relates to a mixing device for mixing fluids in a multiple bed downflow reactor comprising:
(i) a substantially horizontal collection tray;
(ii) a swirl chamber for mixing liquid arranged below the collection tray, having an upper end part that is in direct fluid communication with the upper surface of the collection tray and an outlet opening at its lower end, wherein the swirl chamber has a length that is at least 0.35 times its inner diameter; and
(iii) a substantially horizontal distribution tray located below the swirl chamber, which distribution tray is provided with a plurality of openings or downcomers for downward flow of liquid and gas. The invention further relates to a multiple bed downflow reactor comprising such a mixing device and to the use of such a reactor in hydrocarbon processing.

11 Claims, 2 Drawing Sheets

U.S. PATENT DOCUMENTS

| | | |
|---|---|---|
| 5,462,719 A | 10/1995 | Pedersen et al. |
| 5,567,396 A * | 10/1996 | Perry et al. ................. 422/190 |
| 5,837,208 A * | 11/1998 | Grott et al. ................. 422/195 |
| 5,935,413 A | 8/1999 | Boyd et al. |
| 5,989,502 A * | 11/1999 | Nelson et al. ............... 422/194 |
| 6,180,068 B1 * | 1/2001 | Boyd et al. ................. 422/195 |
| 2004/0136886 A1 * | 7/2004 | McDougald et al. ........ 422/194 |
| 2004/0151643 A1 * | 8/2004 | McDougald et al. ........ 422/194 |
| 2004/0228779 A1 * | 11/2004 | McDougald et al. ........ 422/191 |
| 2004/0234434 A1 * | 11/2004 | Muldowney et al. ....... 422/224 |

FOREIGN PATENT DOCUMENTS

| | | |
|---|---|---|
| EP | 0 679 431 | 11/1995 |
| EP | 0 716 881 | 6/1996 |
| EP | 0 715 544 | 9/1999 |
| WO | 97/46303 | 12/1997 |
| WO | 99/28024 | 6/1999 |
| WO | 00/37171 | 6/2000 |

* cited by examiner

MIXING DEVICE COMPRISING A SWIRL CHAMBER FOR MIXING LIQUID

The present invention relates to a mixing device for mixing fluids in a multiple bed downflow reactor, to a multiple bed downflow reactor comprising such a device and to the use of such a reactor in hydrocarbon processing.

A multiple-bed downflow reactor is a reactor in which gas and liquid flow co-currently downward through a number of reaction beds arranged one below the other. Such reactors are used in the chemical and petroleum refining industries for effecting various processes such as catalytic dewaxing, hydrotreating and hydrocracking. In these processes a liquid phase is typically mixed with a gas phase and the mixed fluids are passed over a particulate catalyst maintained in the reaction beds. As the fluids pass concurrently through a reaction bed, the distribution of liquid and gas across the reaction bed will tend to become uneven with adverse consequences with regard to the extent of reaction and also temperature distribution. In order to achieve a uniform distribution of liquid and gas and of temperature in the fluids entering the next lower reaction bed, a fluid mixing device, of which there are many different types, is usually placed between the reaction beds. These devices provide for liquid-liquid, gas-gas, and gas-liquid mixing and for homogenous distribution of the mixed fluids over the next lower reaction bed.

Such fluid mixing devices are known in the art. Known fluid mixing devices, for example from EP 716 881, WO 97/46303, and WO 99/28024, have the advantage that they have a relatively low vertical length, thereby minimising the space and volume requirements for the devices.

It has, however, been found that these known small-length mixing devices have the disadvantage that fluid mixing is not optimal when gas and/or liquid loads deviate importantly from their normal values, i.e. at high turn-down ratios. Important deviations from the normal values may for example occur after modification of a reactor, modification of a process line-up of which the reactor forms part, or use of an existing reactor for a different purpose.

Thus, there is a need in the art for fluid mixing devices that provide for a good fluid mixing performance over a wide range of gas and liquid loads, i.e. at high turn-down ratios. An object of the present invention is to find an optimum between the length of the mixing device and the fluid mixing performance at high turn-down ratios.

It has now been found that an excellent mixing performance over a wide range of gas and liquid loads, typically from as low as 33% to as high as 200% of the normal loads, can be achieved by using a mixing device wherein the liquid-liquid mixing is performed in a swirl chamber having a certain ratio of length and diameter.

Accordingly, the present invention relates to a mixing device for mixing fluids in a multiple bed downflow reactor comprising:
(i) a substantially horizontal collection tray;
(ii) a swirl chamber for mixing liquid arranged below the collection tray, having an upper end part that is in direct fluid communication with the upper surface of the collection tray and an outlet opening at its lower end, wherein the swirl chamber has a length that is at least 0.35 times its inner diameter; and
(iii) a substantially horizontal distribution tray located below the swirl chamber, which distribution tray is provided with a plurality of openings or downcomers for downward flow of liquid and gas.

For optimal fluid mixing, especially at high turn-down ratios, it is preferred that the swirl chamber has a length that is at least 0.50 times its inner diameter, more preferably at least 0.65 times its inner diameter. In order to limit the length of the mixing device and therewith the volume occupied in the reactor, the length will generally not be larger than 1.5 times its inner diameter.

Reference herein to the length of the swirl chamber is to the vertical distance between the lower point of its inlet or inlets and its outlet opening. In the case of a polygonal swirl chamber, reference herein to its inner diameter is to the largest cross-sectional distance between opposite side walls through the central axis of the chamber.

The mixing device according to the invention may comprise more than one swirl chamber. Preferably it has one swirl chamber located along the central longitudinal axis of the mixing device.

The substantial horizontal collection tray of the mixing device of the present invention may be curved or conical, provided that the upper end part of the swirl chamber is in direct fluid communication with the upper surface of the lowest point of the collection tray. Reference herein to a substantial horizontal tray is to a tray having its symmetry axis perpendicular to the horizontal plane. Preferably, the collection tray is flat.

Preferably, the collection tray is further provided with means for passage of gas, preferably in the form of at least one downcomer extending through the collection tray, the downcomer(s) being provided with a gas inlet opening located above the collection tray and a gas outlet opening located at the level of the lower surface of or below the collection tray. The downcomer(s) is/are preferably provided with a fluid deflector plate located above the gas inlet opening. The gas outlet opening may be axial or radial. Preferably, the downcomer has a radial outlet opening in combination with a curved plate that directs the gas to the radial outlet opening in order to minimise pressure drop.

The mixing device may further comprise means for distributing a quench fluid located above the collecting tray, in order to achieve cooling of effluent between the reaction beds of a multiple-bed downflow reactor. Means for distributing a quench fluid are well known in the art and are described, for example, in EP 427 733, U.S. Pat. No. 3,787,189 and U.S. Pat. No. 3,855,068.

The mixing device has a distribution tray below the outlet opening of the swirl chamber for evenly distributing gas and liquid before the fluids enter a lower reaction bed. Suitable distribution trays are known in the art, for example from EP 716 881, EP 715 544, and U.S. Pat. No. 5,989,502. A preferred distribution tray is the one disclosed in EP 716 881.

The mixing device of the present invention may further comprise a substantially horizontal pre-distribution tray arranged between the swirl chamber and the distribution tray. Such pre-distribution trays are known in the art. The pre-distribution tray may be round, square or rectangular in shape and has preferably a diameter that is smaller than the diameter of the distribution tray. Preferably, the pre-distribution tray is provided with an overflow weir at its perimeter. The tray is provided with a plurality of openings, preferably located near its perimeter. The advantages of having a pre-distribution tray are that it enables liquid to be spread more evenly over the distribution tray and it helps to promote liquid-liquid interactions and thus liquid equilibration.

The present invention further relates to a multiple bed downflow reactor comprising vertically spaced apart reaction beds, preferably beds of catalyst particles, and, between adjacent reaction beds, a mixing device as hereinbefore defined.

Such a reactor has at least one inlet for gas and/or liquid, at least one outlet for reactor effluent and at least two consecutive reaction beds, typically beds of catalyst particles, each bed resting upon a support tray. The construction of suitable support trays is known in the art. For instance, commonly applied support trays comprise one or more permeable plates such as sieve plates supported by support beams, whereby the catalyst bed rests upon the said permeable plates. Gaseous and liquid products formed in the reactions occurring in the catalyst bed are passed through the permeable plates to the subsequent catalyst bed or reactor outlet. Such reactors are typically used in the hydroprocessing of hydrocarbon oils.

In a further aspect, the invention relates to the use of a multiple bed downflow reactor as hereinbefore defined in hydrocarbon processing, preferably in catalytic dewaxing, hydrotreating, hydrocracking, or hydrodesulphurisation.

The mixing device and the reactor according to the invention will now be illustrated by way of example by means of schematic FIGS. 1 and 2. Similar parts in different figures are referred to with the same reference numerals.

Figure 1:
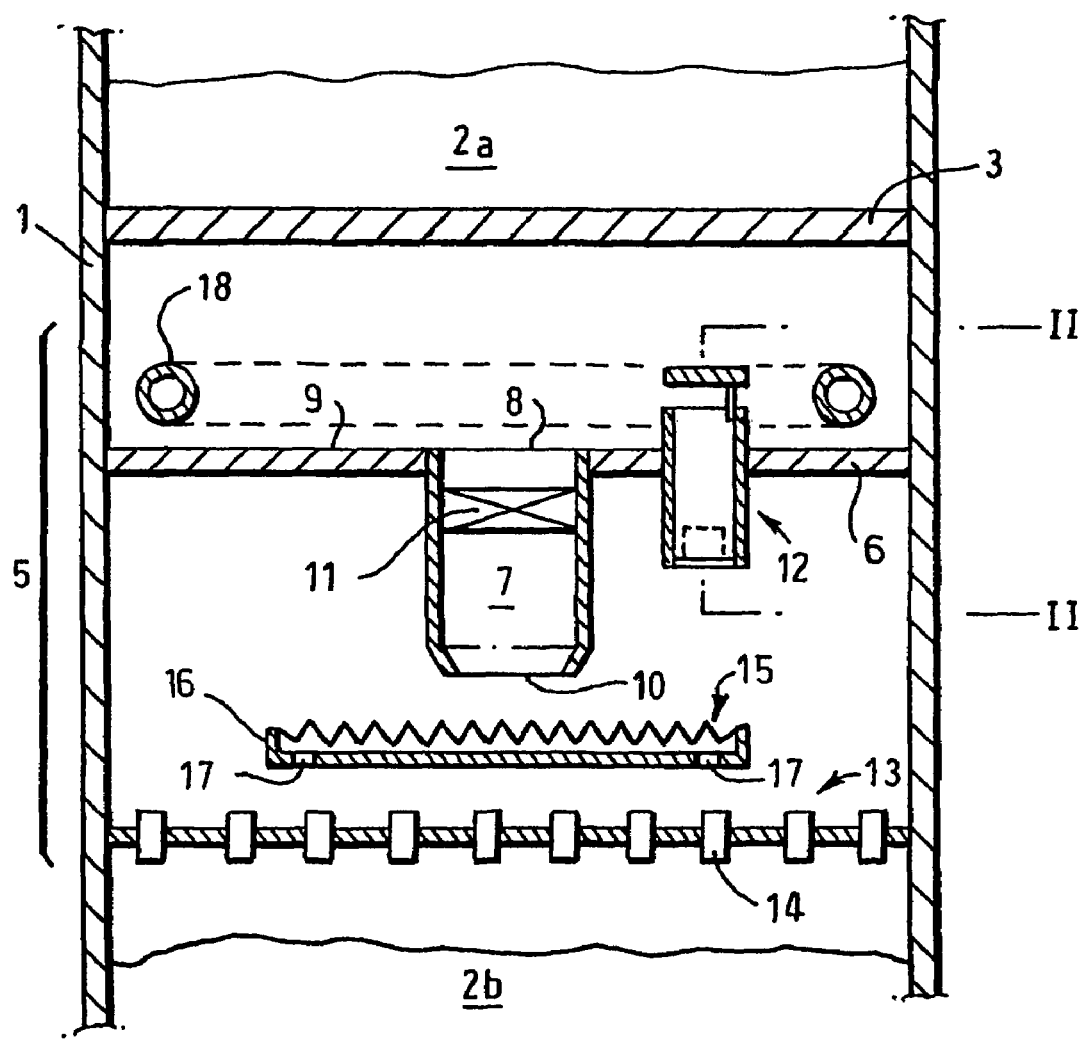
FIG. 1 is a longitudinal section of part of a reactor according to the invention showing an embodiment of the mixing device according to the invention and the catalyst beds located above and below the mixing device.

In FIG. 1 is shown part of the side wall 1 and two adjacent catalyst beds 2a and 2b of a multiple-bed reactor. The catalyst beds 2a and 2b are supported on sieve plate 3, supported by support beams (not shown). A mixing device 5 according to the invention is positioned between catalyst beds 2a and 2b. The mixing device 5 comprises a flat, horizontal collection tray 6 and a swirl chamber 7 arranged below the collection tray 6. The swirl chamber 7 has an open upper end 8 that is in direct fluid communication with the upper surface 9 of collection tray 6, an outlet opening 10 at its lower end, and means 11 for imposing a swirling action on the liquid passing through it. The mixing device 5 comprises means for passage of gas in the form of three downcomers for gas 12 (only one downcomer shown) extending through the collection tray 6. A distribution tray 13 provided with a plurality of downcomers 14 is located below swirl chamber 7 and a pre-distribution tray 15 comprising an overflow weir 16 and a plurality of openings 17 is located between swirl chamber 7 and distribution tray 15. The mixing device further comprises a quench ring 18.

During normal operation of the mixing device shown in FIG. 1, effluent from catalyst bed 2a is cooled by quench fluid from quench ring 18. The liquid effluent is collected on collection tray 6 and enters swirl chamber 7 through its open upper end 8. In the swirling chamber 7, a swirling movement is imposed on the liquid by swirling means 11. Suitable means for imposing a swirling action on fluids are known in the art, for example a tangential inlet opening, swirling vanes or baffles attached to the inner surface of the side wall of the swirl chamber or the like. The combination of a swirling action imposed on the liquid and the length of the swirling chamber result in excellent liquid-liquid mixing over a wide range of liquid and gas throughput. It is an advantage of the mixing device according to the invention that the degree of liquid-liquid mixing achieved in swirl chamber 7 is practically independent of the gas load. The mixed liquid leaves the swirl chamber 7 via outlet opening 10. Preferably, the swirling chamber 7 is provided with vanes (not shown) or the like near the outlet opening 10 to stop the swirling movement of the liquid and thus increasing turbulence and further improving liquid-liquid mixing.

Effluent gas from catalyst bed 2a passes collection tray 6 via downcomers for gas 12. Part of the effluent gas may pass collection tray 6 via swirl chamber 7. It will be appreciated that it will inter alia depend on the gas and liquid loads and on the size, shape and location of the inlet(s) of the swirl chamber and the gas inlet opening(s) of the means for passage of gas, what part of the effluent gas will pass through the means for gas passage and what part through the swirl chamber.

Alternatively, the mixing device according to the invention does not comprise separate means for passage for gas, in which case all effluent gas will pass the collection tray via the swirl chamber.

In the mixing device according to the invention, gas-gas mixing is effected upon quenching and upon passage of gas through the downcomers for gas 12 and/or swirl chamber 7.

The liquid leaving swirl chamber 7 accumulates on pre-distribution tray 15, where it passes downwardly to distribution tray 13 beneath through openings 17 or, sometimes, by breaching the overflow weir 16. Gas is deflected by the pre-distribution tray 15 and flows to the distribution tray 13.

At the distribution tray 13, equilibrated gas and liquid phases are brought together. The distribution tray 13 serves two purposes. Firstly, it evenly distributes liquid and gas before the fluids enter a lower reaction bed 2b and, secondly, it allows contact between liquid and gas to provide liquid-gas interaction.

Figure 2:
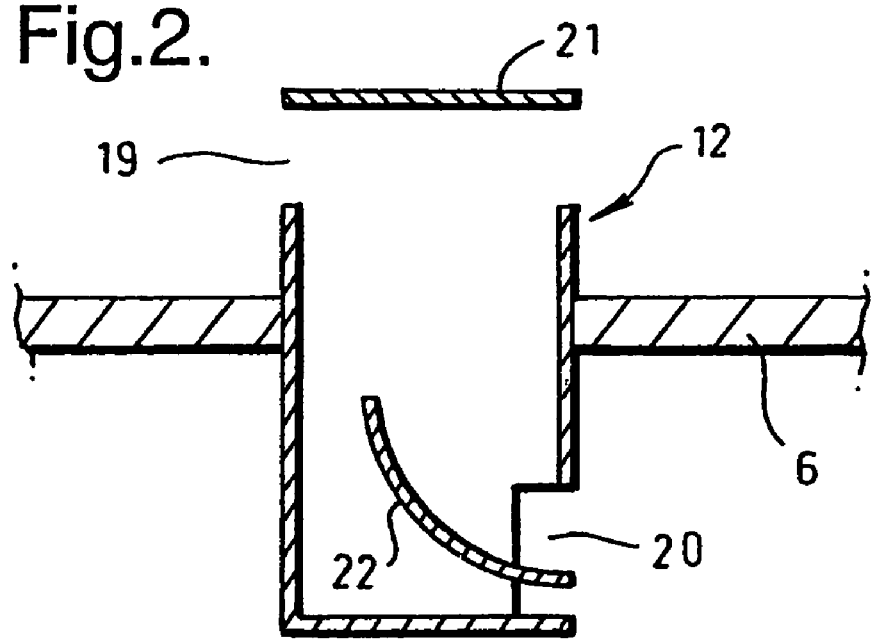
FIG. 2 shows a longitudinal section of the downcomer for gas of the mixing device shown in FIG. 1, the section being through line II—II in the plane perpendicular to the plane of the drawing of FIG. 1.

In FIG. 2, one of the downcomers for gas 12 of FIG. 1 is shown in greater detail. The downcomer 12 has a gas inlet opening 19 located above collection tray 6, a radial gas outlet opening 20, located below collection tray 6, a fluid deflector plate 21 located above gas inlet opening 19, and a curved plate 22 to direct the gas that passes through the downcomer to radial outlet opening 20.

We claim:

1. A mixing device for mixing fluids in a multiple bed downflow reactor comprising:
   (i) a substantially horizontal collection tray;
   (ii) a swirl chamber for mixing liquid arranged below the collection tray, having an upper end part that is in direct fluid communication with the upper surface of the collection tray and an outlet opening at its lower end, wherein the swirl chamber has a length that is at least 0.35 times its inner diameter; and
   (iii) a substantially horizontal distribution tray located below the swirl chamber, which distribution tray is provided with a plurality of openings or downcomers for downward flow of liquid and gas.

2. The mixing device according to claim 1, wherein the length of the swirl chamber is at least 0.5 times its inner diameter.

3. The mixing device according to claim 2, wherein the collection tray is further provided with means for passage of gas,-said means to passage of gas comprises at least one downcomer extending through the collection tray, the downcomer(s) being provided with a gas inlet opening located above the collection tray and a gas outlet opening located at the level of the lower surface of or below the collection tray.

4. The mixing device according to claim 2, which further comprises means for distributing a quench fluid, the means being located above the collection tray.

5. The mixing device according to claim 2, which further comprises a substantially horizontal pre-distribution tray arranged between the swirl chamber and the distribution tray.

6. The mixing device according to claim 3, which further comprises means for distributing a quench fluid, the means being located above the collection tray.

7. The mixing device according to claim 6, which further comprises a substantially horizontal pre-distribution tray arranged between the swirl chamber and the distribution tray.

8. The mixing device according to claim 3, which further comprises a substantially horizontal pre-distribution tray arranged between the swirl chamber and the distribution tray.

9. The mixing device according to claim 1, wherein the collection tray is further provided with means for passage of gas,-said means to passage of gas comprises-at least one downcomer extending through the collection tray, the downcomer(s) being provided with a gas inlet opening located above the collection tray and a gas outlet opening located at the level of the lower surface of or below the collection tray.

10. The mixing device according to claim 1, which further comprises means for distributing a quench fluid, the means being located above the collection tray.

11. The mixing device according to claim 1, which further comprises a substantially horizontal pre-distribution tray arranged between the swirl chamber and the distribution tray.

\* \* \* \* \*